US 6,626,455 B2

(12) United States Patent
Webber et al.

(10) Patent No.: US 6,626,455 B2
(45) Date of Patent: Sep. 30, 2003

(54) DEFORMABLE AIR BAG MODULE HOUSING

(75) Inventors: James Lloyd Webber, Shelby Township, MI (US); Jeffrey Alan Shepherd, Troy, OH (US); Mark Thomas Winters, Troy, OH (US); Laura Adelle Hawthorn, Tipp City, OH (US)

(73) Assignee: Delphi Technologies, Inc., Troy, MI (US)

( * ) Notice: Subject to any disclaimer, the term of this patent is extended or adjusted under 35 U.S.C. 154(b) by 2 days.

(21) Appl. No.: 09/804,965

(22) Filed: Mar. 13, 2001

(65) Prior Publication Data

US 2002/0130492 A1 Sep. 19, 2002

(51) Int. Cl.[7] .............................................. B60R 21/16
(52) U.S. Cl. ............................. 280/728.2; 280/728.3; 280/732
(58) Field of Search ..................... 280/728.2, 728.3, 280/732, 741, 743.1

(56) References Cited

U.S. PATENT DOCUMENTS

| 5,460,403 | A | * | 10/1995 | Hansen et al. | 280/732 |
|---|---|---|---|---|---|
| 5,498,024 | A | * | 3/1996 | Caruso et al. | 280/728.2 |
| 5,533,747 | A | * | 7/1996 | Rose | 280/728.2 |
| 5,678,853 | A | * | 10/1997 | Maly | 280/730.2 |
| 5,762,363 | A | * | 6/1998 | Brown et al. | 280/728.2 |
| 5,810,389 | A | * | 9/1998 | Yamaji et al. | 280/728.3 |
| 5,810,390 | A | * | 9/1998 | Enders et al. | 280/728.2 |
| 5,863,063 | A | * | 1/1999 | Harrell | 280/728.3 |
| 6,024,377 | A | * | 2/2000 | Lane, Jr. | 280/728.3 |
| 6,042,139 | A | * | 3/2000 | Knox | 280/728.3 |
| 6,045,151 | A | * | 4/2000 | Wu | 280/728.3 |
| 6,237,936 | B1 | * | 5/2001 | Quade et al. | 280/728.2 |

FOREIGN PATENT DOCUMENTS

| JP | 811664 | * | 1/1996 | 280/728.2 |
|---|---|---|---|---|
| JP | 1143001 | * | 2/1999 | 280/728.2 |

* cited by examiner

Primary Examiner—Paul N. Dickson
Assistant Examiner—Toan C To
(74) Attorney, Agent, or Firm—Scott A. McBain

(57) ABSTRACT

This present invention provides a deformable air bag module for use in an instrument panel or door panel of a vehicle. The air bag module has a deformable housing with an inflator and an air bag cushion being disposed within the deformable housing. The module housing has a neck portion defining an opening formed at a first side, wherein the first side is coupled to the instrument panel. The instrument panel includes first and second instrument panel sections and the module housing is disposed about the first and second instrument panel sections so that deployment of the air bag cushion causes deformation of the module housing resulting in the first and second instrument panel sections separating and deployment of the air bag cushion therebetween. When a tear seam is used to define the first and second instrument panel sections, the present invention permits the tear seam to be formed thicker in size and more durable.

24 Claims, 6 Drawing Sheets

DEFORMABLE AIR BAG MODULE HOUSING

TECHNICAL FIELD

The present invention relates generally to vehicle supplemental inflatable restraint systems and, more particularly, to the interaction between the air bag module and an instrument panel or door panel during deployment of an air bag cushion.

BACKGROUND OF THE INVENTION

Driver side or passenger side supplemental inflatable restraint (SIR) systems typically include an air bag stored in a housing module within the interior of the vehicle in close proximity to either the driver or one or more passengers. SIR systems are designed to actuate upon sudden deceleration so as to rapidly deploy an air bag to restrain the movement of the driver or passengers. During deployment, gas is emitted rapidly from an inflator into the air bag to expand it to a fully inflated condition.

Air bag passive restraint systems include an inflator, which produces gas to inflate the air bag cushion. Known inflators for air bag modules are generally of three types. One type is the pure gas inflator wherein a pressure vessel contains stored pressurized gas. The pressure vessel communicates with the cushion through various types of rupturable outlets or diaphragms. Another type is the gas generator wherein a propellant is ignited and the resultant gas created flows through an outlet to the cushion. A third type is the hybrid or augmented type. This type includes a pressure vessel containing stored pressurized gas and a gas generator. When the generator is ignited, the resultant gas flows with and heats the stored gas going to the cushion through the pressure vessel outlet.

Typically, the air bag module is mounted to a steering wheel hub or is disposed within another location in the vehicle, such as the instrument panel or a driver side or passenger side door. The air bag module is positioned relative to the instrument panel so that a relatively thin tear seam formed in the instrument panel is designed to tear open under the force of the air bag cushion, which is directed towards the tear seam. Because conventional air bag modules use the pressure generated in the air bag cushion to rupture the tear seam, the tear seam itself is relatively thin. The thinner the tear seam, the greater the likelihood that over time the tear seam may weaken.

SUMMARY OF THE INVENTION

This invention offers advantages and alternatives over the prior art by providing a deformable air bag module for use in an instrument panel or the like of a vehicle. The air bag module of the present invention is intended for use in passenger side (SIR) systems and also in side impact systems in which the air bag module is disposed in a door panel. Furthermore, the present invention may also be used in a seat mounted air bag assembly. The air bag module has a deformable module housing with an inflator and an air bag cushion being disposed within the deformable housing. The module housing has a neck portion defining an opening formed at a first end, wherein the first end is coupled to the instrument panel. More specifically, the instrument panel includes first and second instrument panel sections with retaining members being disposed on each of the first and second instrument panel members for retaining the module house thereto. The first end of the module housing preferably includes a flange which is received within the retaining members to securely couple the air bag module to the first and second instrument panel sections.

In one embodiment, the instrument panel includes a front and rear surface, wherein the rear surface includes a tear seam which defines the first and second instrument panel sections. The module housing is disposed about the tear seam so that the tear seam is aligned with the opening of the module housing. Under deployment conditions, the inflator generates inflator gas which inflates the air bag cushion. The inflating air bag cushion is directed toward the neck portion and the opening defined thereby and the expansion of the air bag cushion causes the neck portion to deform resulting in expansion of the module opening. This deformation of the module housing causes the first and second instrument panel sections to separate along the tear seam because the module housing is coupled to both the first and second instrument panel sections. The separating first and second instrument panel sections create a path for the air bag cushion to escape from the air bag module and deploy outwardly from the instrument panel.

In a second embodiment, the instrument panel has first and second instrument panel sections which abut one another. The module housing is disposed about the first and second instrument panel sections where the two sections abut one another so that the abutting portions of the first and second instrument panel sections are aligned with the opening of the module housing. Under deployment conditions, the inflator generates inflator gas which inflates the air bag cushion. The inflating air bag cushion is directed toward the neck portion and the opening defined thereby and the expansion of the air bag cushion causes the neck portion to deform resulting in expansion of the module opening. This deformation of the module housing causes the first and second instrument panel sections to separate because the module housing is coupled to both the first and second instrument panel sections. The separating first and second instrument panel sections create a path for the air bag cushion to escape from the air bag module and deploy outwardly from the instrument panel.

In a third embodiment, the instrument panel has first and second instrument panel sections with a panel opening formed therebetween. A swivable door is disposed within the panel opening. The module housing is disposed about the panel opening and door so that the panel opening is aligned with the opening of the module. During deployment conditions, the air bag module deforms due to the movement of the air bag cushion and this deformation causes the first and second instrument panel sections to separate along the panel opening because the module housing is coupled to both the first and second instrument panel sections. The separation of the first and second instrument panel sections causes the door to swing open and creates a path for the air bag cushion to escape from the air bag module and deploy outwardly from the instrument panel.

The air bag module of the present invention uses the natural forces (i.e. pressure build-up in the air bag cushion) and bell-mouthing of the housing advantaseously as a mechanical means rupturing the tear seam or separating the panel sections permitting deployment of the air bag cushion. Unlike conventional systems, the air bag cushion itself is not the primary member for causing the separation of the panel. In other words, the pressure of the air bag cushion contacting the panel is not the primary force to cause separation thereof. As a result, a thicker more durable tear seam may be used because the force which is intended to rupture the tear seam is not solely the pressure generated by the air bag cushion.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example only, with reference to the accompanying drawing in which.

DETAILED DESCRIPTION OF THE INVENTION

Figure 1:
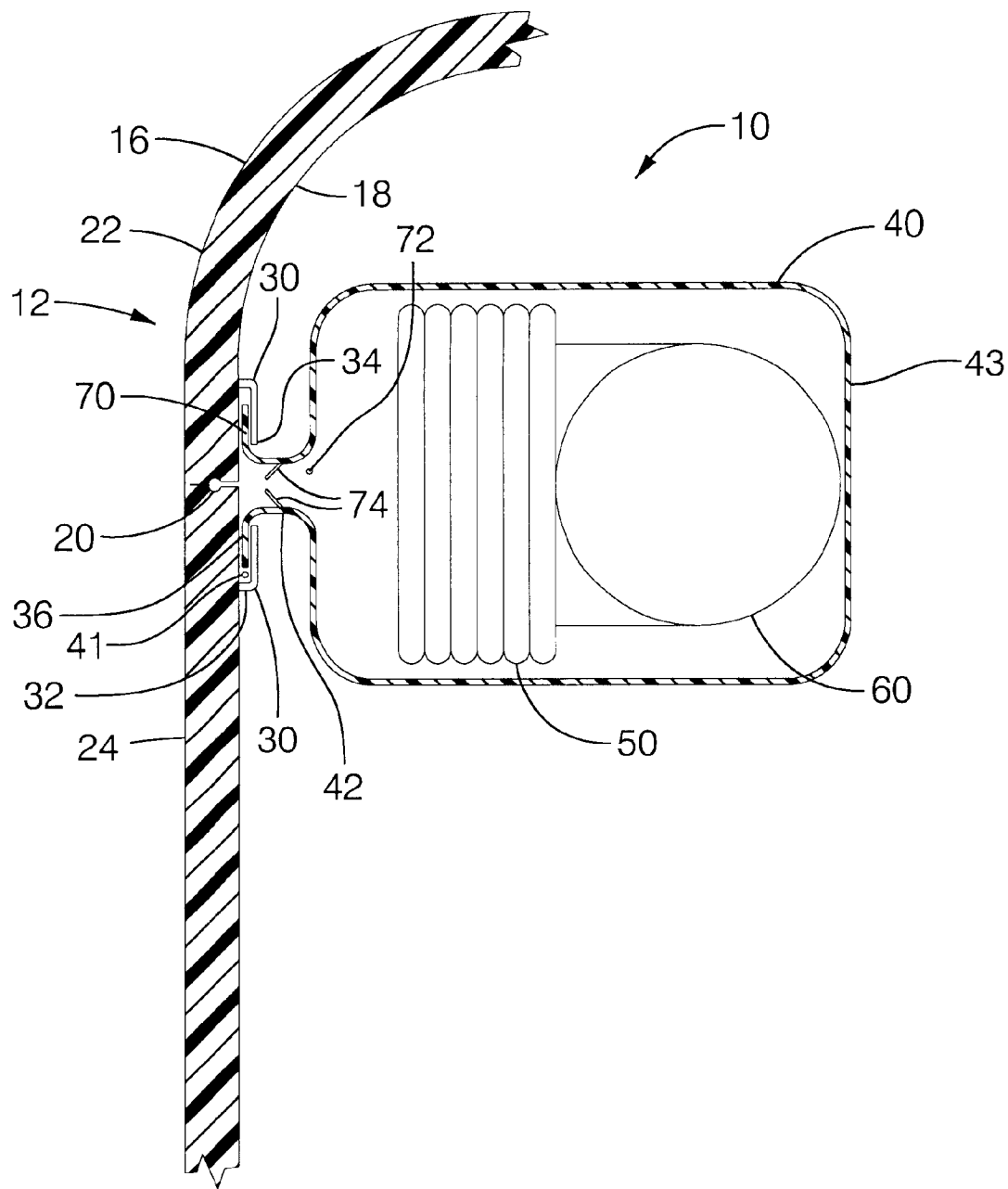
FIG. 1 is a cross-sectional side elevational view of an air bag module disposed within an instrument panel in a pre-deployment condition according to a first embodiment of the present invention.

Referring to the FIG. 1, a mounted air bag module according to a first embodiment is illustrated in a pre-deployment condition. The mounted air bag module 10 is disposed within and mounted to an instrument panel 12 or the like of a vehicle (not shown). It being understood that the air bag module 10 may be used in other SIR systems, including side impact systems, in which the air bag module 10 is disposed in a door panel or the like. It is also within the scope of the present invention that the air bag module 10 may be disposed in a seat mounted air bag assembly. In the exemplary first embodiment, the instrument panel 12 includes a front surface 16 which faces one or more occupants of the vehicle and an opposing rear surface 18. The instrument panel 12 includes at a predetermined location a tear seam 20 formed in the rear surface 18. Tear seam 20 comprises a weakened section of the rear surface 18 and as shown in the illustrated embodiment, the tear seam 20 preferably comprises a slot extending longitudinally across the rear surface 18. Accordingly, the tear seam 20 can generally be thought of as dividing the instrument panel 12 into a first instrument panel section 22 and a second instrument panel section 24.

Figure 2:
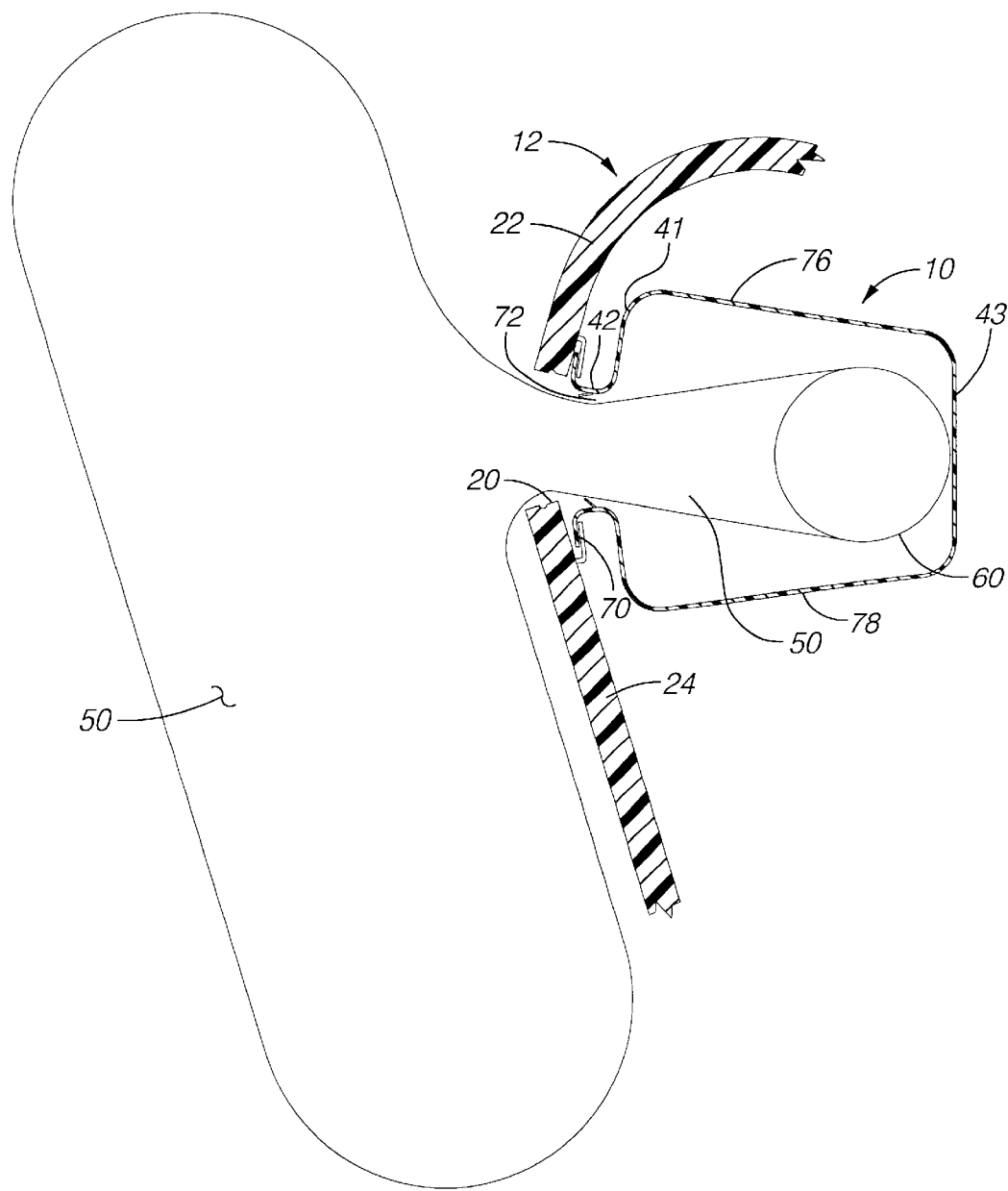
FIG. 2 is a cross-sectional side elevational view of the air bag module and instrument panel of FIG. 1 during deployment thereof.

The instrument panel 12 further includes retaining members 30 disposed about the tear seam 20 formed therein. In the exemplary embodiment, the retaining members 30 comprises a pair of opposing retaining members. It will be appreciated that the pair of opposing retaining member 30 may comprise molded members of the instrument panel which are integrally formed therewith. More specifically, one of retaining members 30 is disposed on the rear surface 18 of the first instrument panel section 22 and the other of the retaining members 30 is disposed on the rear surface 18 of the second instrument panel section 24. As shown in FIGS. 1–2, the retaining members 30 comprise clips having first ends 32 connected to the rear surface 18 of the first and second instrument panel sections 22, 24, respectively, and second free ends 34. Each retaining member 30 defines a retaining slot 36 formed between the rear surface 18 and the retaining member 30. As will be described in greater detail hereinafter, the retaining members 30, including slots 36, serve to condition and secure the air bag module 10 to the first and second instrument panel sections 22, 24. In the pre-deployment condition shown in FIG. 1, portions of the illustrated retaining members 30 are generally parallel to the first and second instrument panel sections 22, 24. The tear seam 20 is disposed between the second free ends 34 of the retaining members 30.

Air bag module 10 includes a housing 40 in which an air bag cushion 50 and an inflator 60 are disposed therein. Housing 40 may take a variety of shapes and in the exemplary embodiment, the housing 40 has a generally cylindrical shape. The air bag cushion 50 is disposed proximate one side 41 of the housing 40 and the inflator 60 is disposed proximate another side 43 of the housing 40. In a preferred embodiment, the housing 40 comprises what is commonly referred to as a housing.

The housing 40 includes a neck portion 42 leading to a retaining flange 70. Formed between the neck portion 42 and the retaining flange 70 is an opening (mouth) 72 which provides fluid communication between the inner components of the air bag module 10, more specifically, the air bag cushion 50, and the outside of the air bag module 10, as will be described in greater detail hereinafter. The neck portion 42, retaining flange 70, and the opening 72 form what is commonly known as a bellmouth design. Formed within the neck portion 42 of the housing 40 is at least one and preferably a pair of opposing tabs 74. Each tab 74 connects with the neck portion 42 at one end and the opposite end extends inwardly within the opening 72 defined the neck portion 72. Tabs 74 serve to direct the air bag cushion 50 through the neck portion 42 so that the air bag cushion 50 is partially protected from edges of the retaining members 30 during deployment of the air bag cushion 50, as will be described with reference to FIG. 2. Opening (mouth) 72 of the housing 40 surrounds the tear seam 20 when the air bag module 10 is secured to the first and second instrument panel sections 22, 24. The neck portion 42 is disposed proximate the air bag cushion 50 so that an inflation path is created for the air bag cushion 50 to escape the air bag module 10 during deployment thereof.

The air bag module 10 is secured to the rear surface 18 of the first and second instrument panel sections 22, 24 by disposing the retaining flange 70 within the retaining slots 36 defined by the retaining members 30. In other words, a secure interface fit is created by engaging the retaining flange 70 with the retaining members 30.

A controller (not shown), e.g., a sensing and actuating system, generates actuation signals to inflator 60 in response to velocity responsive sensors (not shown) mounted on the vehicle bumper and/or acceleration or inertia responsive sensors mounted on a part of the vehicle occupant compartment, such as the fire wall. In response to the sensed signals, the controller provides ignition signals to the inflator 60 to initiate deployment of the air bag cushion 50 in accordance with a predetermined level of deceleration. In response to the ignition signals, the inflator 60 releases an appropriate amount of gas into the air bag cushion 50 through vent discharge ports (not shown) formed in the inflator 60.

As is known, the inflator 60 is for generating heated inflator gas upon the sensing of predetermined vehicle conditions, i.e., rapid deceleration, to inflate the air bag cushion 50. The inflator 60 may be of any conventional construction for generating the inflator gas to inflate the air bag cushion 50. For example, the inflator 60 may be a single stage inflator which outputs inflator gas as a single level for inflating the air bag cushion 50 or the inflator 60 may comprise a dual level inflator which offers both full-deployment inflation and reduced deployment inflation.

Referring now to FIG. 2 in which the air bag module 10 and the instrument panel 12 are shown during deployment conditions. In the operation of the air bag module 10 and upon actuation of the inflator 60 in response to the sudden deceleration of the vehicle, the inflator 60 generates a predetermined volume of heated inflator gas which is directed into the air bag cushion 50. Because air bag module 10 preferably is of a type having a deformable housing 40, the inflation of the air bag cushion 50 causes a deformation of the housing 40 as the air bag cushion 40 is deployed. More specifically, as the volume of the air bag cushion 50 expands, the air bag cushion 50 travels within the neck portion 42 and the expanding volume of the air bag cushion 50 causes the neck portion 42 to expand resulting in the expansion of the area of opening 72 and the separation of the housing 40. In other words top and bottom walls 76, 78, respectively, of the housing 40 separate from one another to permit the inflating air bag cushion 50 to exit the air bag module 10. This inflating action is commonly referred to as bellmouthing. The bellmouthing is encouraged by providing a restricted mouth area (opening 72 and neck portion 42) so that pressure build-up is encouraged in the housing 40. It is this pressure build-up along with the design of the housing 40 which forces the "bellmouthing" to occur. In addition, the retaining flange 70 is designed to allow the deformation to occur in an unrestricted manner.

As shown in FIG. 2, during the deployment of the air bag cushion 50, the first and second instrument panel sections 22, 24 separate from one another along the tear seam 20 (weakened portion of the instrument panel 12). This results because first, the location of the tear seam 20 relative to the opening 72 permits the air bag cushion 50 to be directed through the opening 72 to the weakened tear seam 20 and the force generated by the air bag cushion 50 causes the weakened tear seam 20 to rupture. Second and as previously mentioned, the deployment of the air bag cushion 50 also causes the neck portion 42 and the retaining flange 70 to separate from one another. This action causes the first and second instrument panel sections 22, 24 to separate from one another because the retaining flange 70 is secured to the first and second instrument panel sections 22, 24. In other words, the designed-in deformation aspect of the housing 40 and bellmouthing effect thereof causes the separation between the first and second instrument panel sections 22, 24 along the tear seam 20. This separation becomes the escape path for the deploying air bag cushion 50 as the air bag cushion 50 outwardly travels away from the instrument panel 12.

Advantageously, because the tear seam 20 is formed in the rear surface 18 of the instrument panel 12, the tear seam 20 is hidden from the view of the occupants of the vehicle. This first embodiment is thus termed a single piece instrument panel. The air bag module of the present invention uses the natural forces (i.e. pressure build-up in the air bag cushion) and bell-mouthing of the housing advantageously as a mechanical means for repturing the tear seam or separating the panel sections permitting deployment of the air bag cushion. Unlike conventional systems, the air bag cushion itself is not the primary member for causing the separation of the panel. In other words, the pressure of the air bag cushion contacting the panel is not the primary force to cause separation thereof. As a result, a thicker more durable tear seam may be used because the force which is intended to rupture the tear seam is not solely the pressure generated by the air bag cushion.

Figure 3:
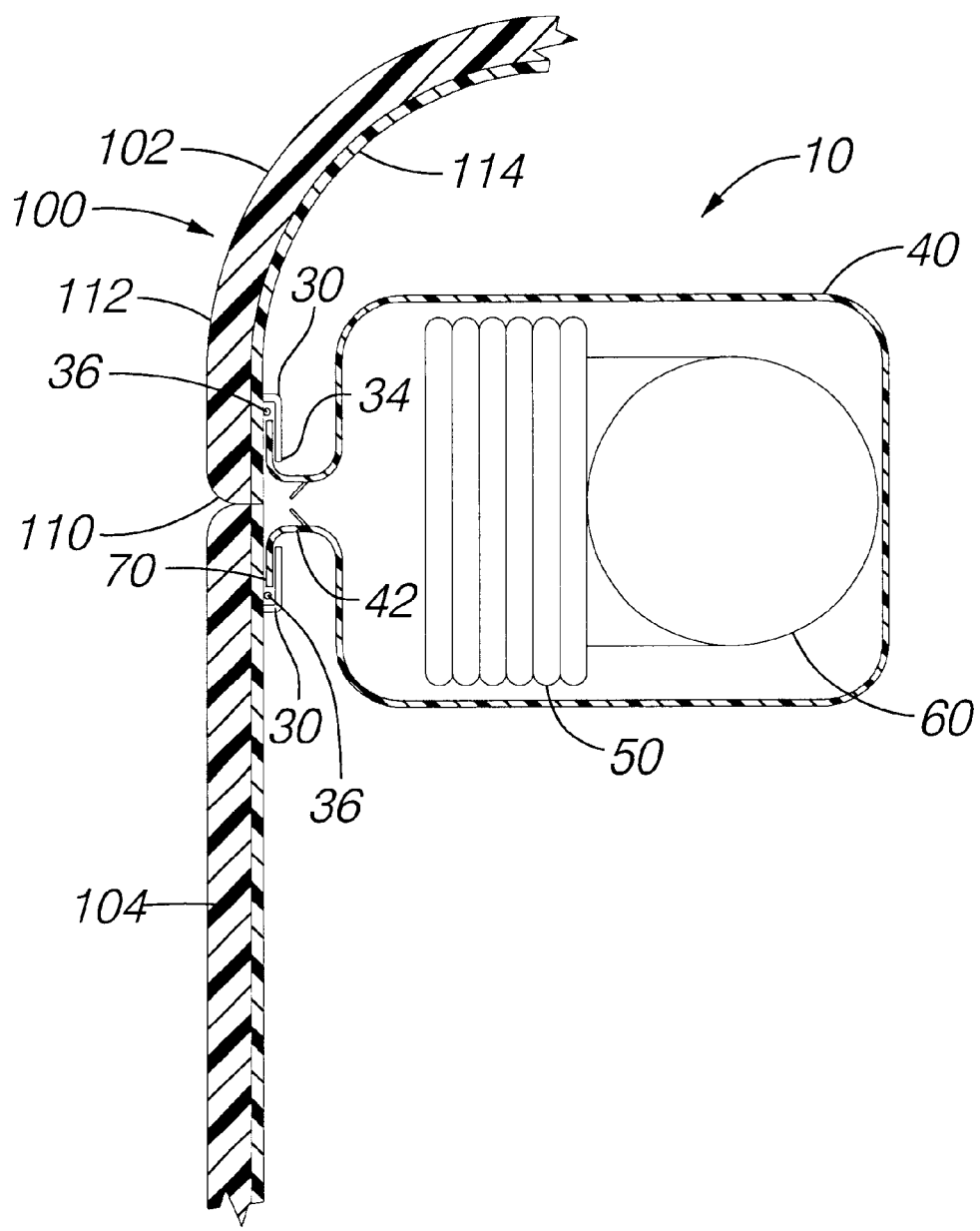
FIG. 3 is a cross-sectional side elevational view of an air bag module disposed within an instrument panel in a pre-deployment condition according to a second embodiment of the present invention.
Figure 4:
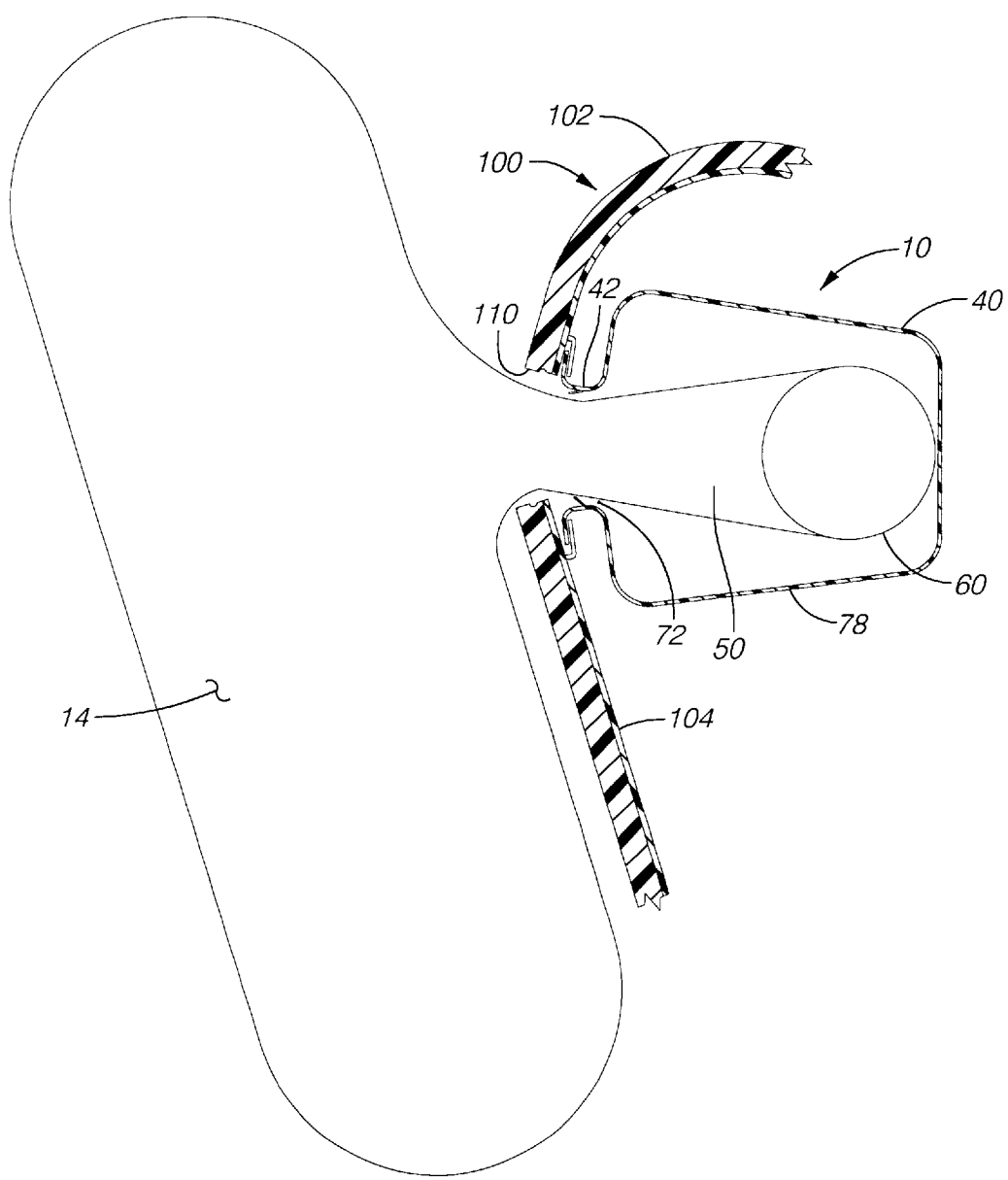
FIG. 4 is a cross-sectional side elevational view of the air bag module and instrument panel of FIG. 3 during deployment thereof.

Referring now to FIGS. 3–4, in which a mounted air bag module according to a second embodiment is illustrated. FIG. 3 shows the air bag module 10 being mounted to an instrument panel 100. The instrument panel 100 is very similar to the instrument panel 10 with one difference being that the instrument panel 100 includes first and second instrument panel sections 102, 104, respectively. The first and second instrument panel sections 102, 104 are separated from one another along a partition seam 110 (panel dividing line), which defines the first and second instrument panel sections 102, 104. In this second embodiment, the partition seam 110 is formed within a front surface 112 of the instrument panel 100 instead of being formed in a rear surface 114. Accordingly, the partition seam 110 is formed in the instrument panel 100 such that it faces the occupants of the vehicle. The air bag module 10 is secured to the instrument panel 100 in the same manner as the air bag module 10 is secured to the instrument panel 10 of FIGS. 1–2. More specifically, the first and second instrument panel sections 102, 104 each include a retaining member 30 disposed about the partition seam 110. The second free ends 34 of the retaining members 30 extend toward the partition seam 110.

The air bag module 10 is secured to the rear surface 114 of the first and second instrument panel sections 102, 104 by disposing the retaining flange 70 within the retaining slots 36 defined by the retaining members 30 to produce a secure interface fit between the retaining flange 70 and the retaining members 30.

Referring now to FIG. 4 in which the deployment of the air bag module 10, disposed within the instrument panel 100, is shown. In the operation of the air bag module 10 and upon actuation of the inflator 60 in response to the sudden deceleration of the vehicle, the inflator 60 generates a predetermined volume of heated inflator gas which is directed into the air bag cushion 50. Because air bag module 10 includes a deformable housing 40, the inflation of the air bag cushion 50 causes a deformation of the housing 40 as the air bag cushion 40 is deployed. More specifically, as the volume of the air bag cushion 50 expands, the air bag cushion 50 travels within the neck portion 42 and the expanding volume of the air bag cushion 50 causes the neck portion 42 to expand resulting in the expansion of the area of opening 72 and the separation of the housing 40 due to this bellmouthing action.

As shown in FIG. 4, during the deployment of the air bag cushion 14, the first and second instrument panel sections 102, 104 separate from one another along the partition seam 110. This results because first, the location of the partition seam 110 relative to the opening 72 permits the air bag cushion 50 to be directed through the opening 72 to the partition seam 110 and the force generated by the air bag cushion 50 causes the first and second instrument panel sections 102, 104 to separate along the partition seam 110. Second and as previously mentioned, the deployment of the air bag cushion 50 also causes the neck portion 42 and the retaining flange 70 to expand. This action causes the first and second instrument panel sections 102, 104 to separate from one another because the retaining flange 70 is secured to the first and second instrument panel sections 102, 104. In other words, the designed-in deformation aspect of the housing 40 and bellmouthing effect thereof causes the separation between the first and second instrument panel sections 102, 104. This separation becomes the escape path for the deploying air bag cushion 50 as the air bag cushion 50 outwardly travels away from the instrument panel 100.

Figure 5:
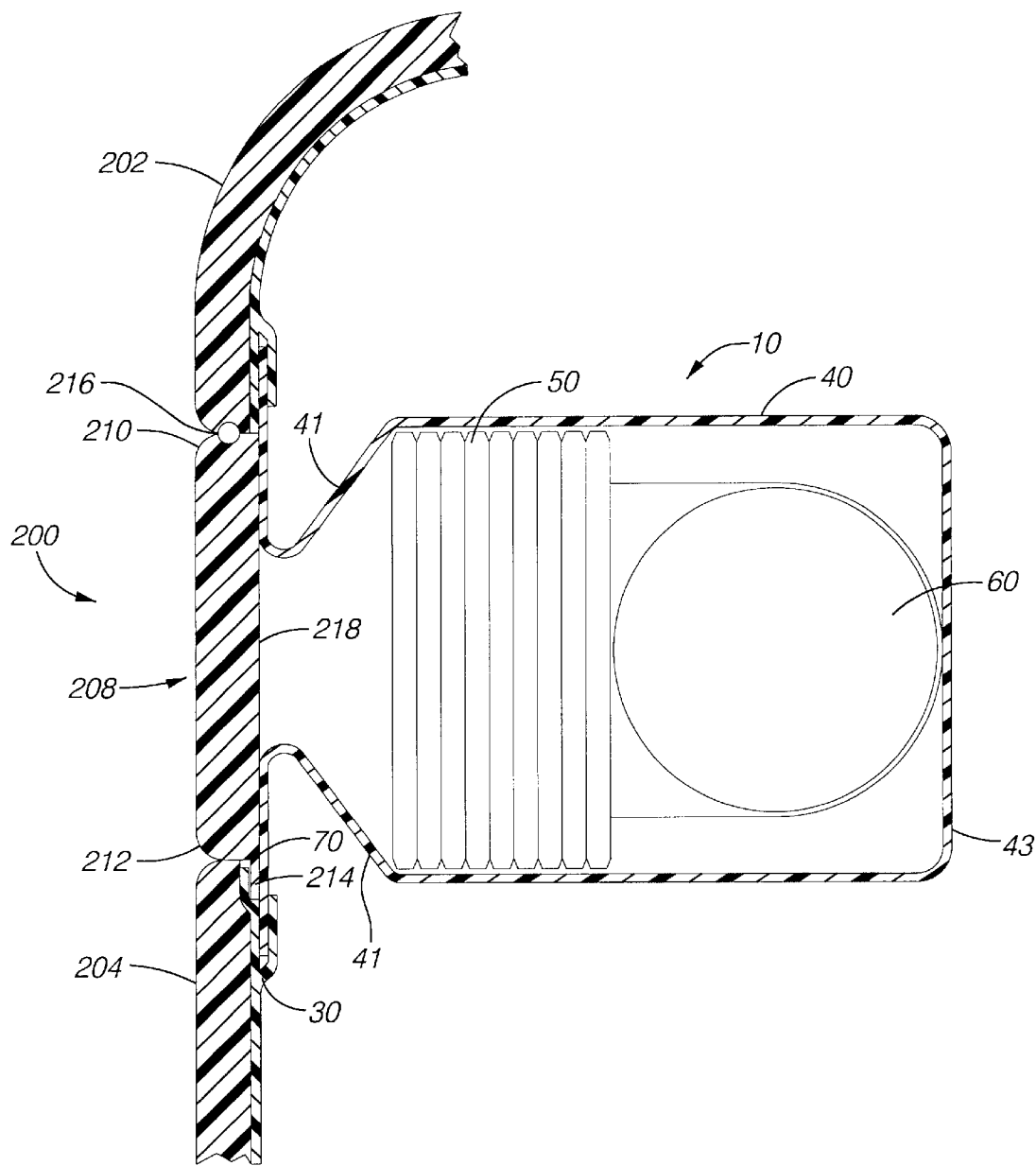
FIG. 5 is a cross-sectional side elevational view of an air bag module and instrument panel in a pre-deployment condition according to a third embodiment of the present invention.
Figure 6:
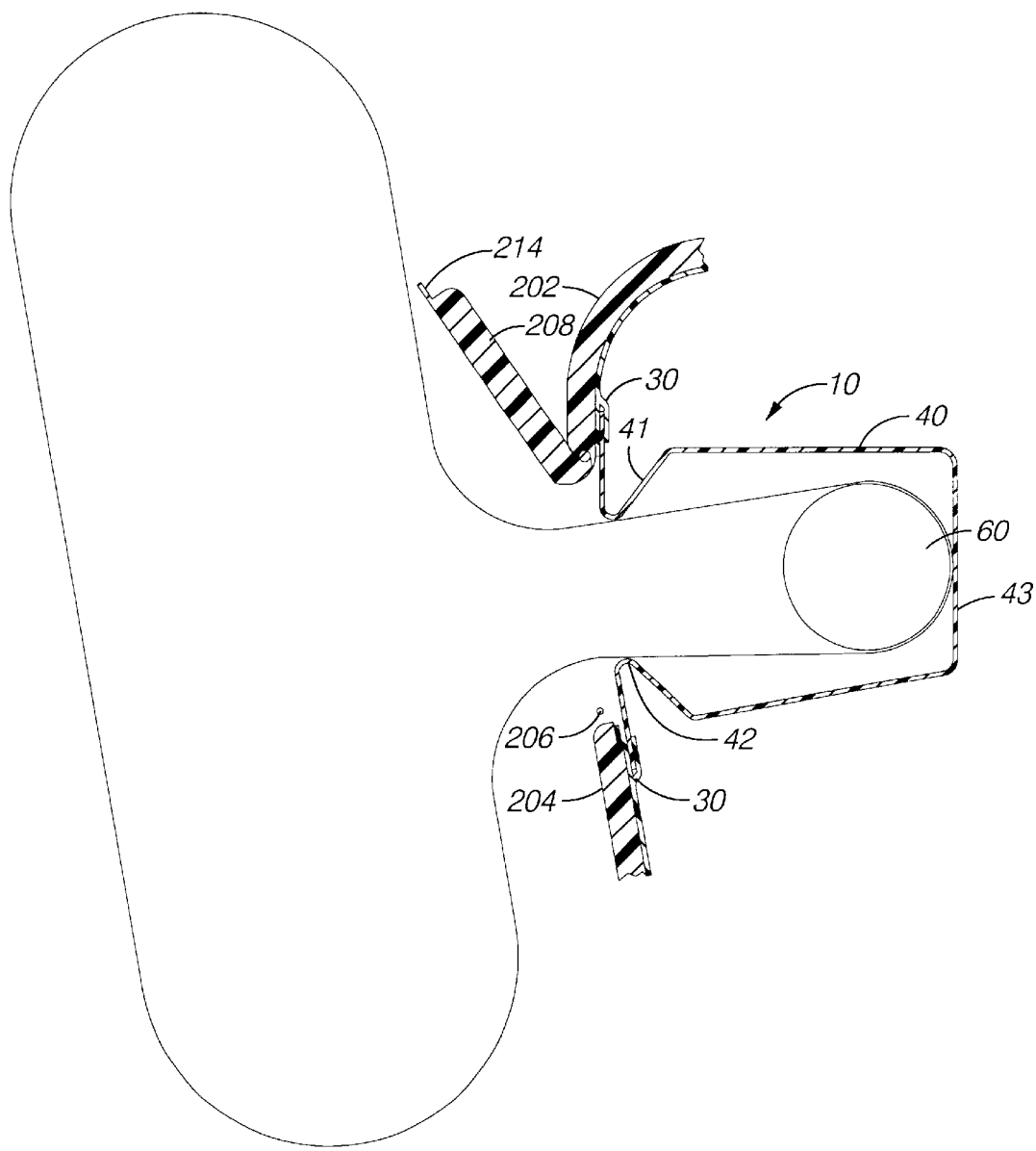
FIG. 6 is a cross-sectional side elevational view of the air bag module and instrument panel of FIG. 5 during deployment thereof.

Referring now to FIGS. 5–6, in which a mounted air bag module according to a third embodiment is illustrated. FIG. 5 shows the air bag module 10 being mounted to an instrument panel 200. The instrument panel 200 includes first and second instrument panel sections 202, 204, respectively. The first and second instrument panel sections 202, 204 are separated by an opening 206. A instrument panel door 208 serves to enclose the opening 206. Door 208 has a first end 210 and an opposing second end 212, wherein the first end 210 is adjacent to the first instrument panel section 202 and the second end 212 is adjacent to the second instrument panel section 204. At second end 212, door 208 includes a locking tab 214 extending outwardly therefrom to releasably lock second end 212 to the second instrument panel section 204. The first end 210 is preferably connected to the first instrument panel section 202 by a hinge 216 so door 208 is free to swivel about hinge 216. Door 208 further includes a rear surface 218 which contacts a portion of the retaining members 30 in the pre-deployment condition shown in FIG. 5. Furthermore, the door 208 is larger than the opening 206 to ensure a proper fit between the door 208 and the instrument panel 200. By oversizing the door 208 in relation to the instrument panel 200, the any cracks therebetween are reduced or eliminated and the fit between the door 208 and the instrument panel 200 is improved.

Referring now to FIG. 6 in which the deployment of the air bag module 10, disposed within the instrument panel 200, is shown. In the operation of the air bag module 10 and upon actuation of the inflator 60 in response to the sudden deceleration of the vehicle, the inflator 60 generates a predetermined volume of heated inflator gas which is directed into the air bag cushion 50. Because air bag module 10 includes a deformable housing 40, the inflation of the air bag cushion 50 causes a deformation of the housing 40 as the air bag cushion 40 is deployed. More specifically, as the volume of the air bag cushion 50 expands, the air bag cushion 50 travels within the neck portion 42 and the expanding volume of the air bag cushion 50 causes the neck portion 42 to expand resulting in the expansion of the area of opening 72 and the separation of the housing 40 due to this bellmouthing action.

As shown in FIG. 6, during the deployment of the air bag cushion 14, the bellmouthing action of the housing 40 causes the first and second instrument panel sections 202, 204 to separate from one another and this deformation of the instrument panel 200 causes permits the door 208 to swing open because the opening 206 becomes sufficiently large to match or exceed the size of the door 208 resulting in the door 208 being free to swing open about hinge 216. Once the door 208 opens, the air bag cushion 50 is free to travel through opening 206 of the instrument panel 200, wherein the opening 206 comprises the escape path for the deploying air bag cushion 50.

The present invention provides advantages over the prior art by providing a deformable housing 40 for use in either a two piece instrument panel or a single piece instrument panel with a hidden door formed therein. In the first and second embodiments, the cost of a separate door is avoided and styling freedom is enhanced because a separate door 208 is not necessary. In the third embodiment, benefits are provided when an instrument panel with a separate door is desireable by the vehicle customer. This permits installation of the door directly onto the instrument panel and this third embodiment minimizes certain fit/finish issues when the door is a part of the airbag module. It also permits the door to be larger than the opening as a method of preventing cracks between the instrument panel and the module.

It will be understood that a person skilled in the art may make modifications to the preferred embodiment shown herein within the scope and intent of the claims. While the preferred embodiment has been described as carried out in a specific embodiment thereof, it is not intended to be limited thereby but is intended to cover the invention broadly within the scope and spirit of the claims.

What is claimed is:

1. A deformable air bag module for use in an instrument panel of a vehicle, the instrument panel having a first instrument panel section and an adjacent second instrument panel section, the deformable air bag module comprising:

a module housing having a first side and an opposing second side, wherein the module housing has a neck portion defining an opening at the first side, the opening being defined by portions of said neck portion being in a facing spaced relationship, the first side being coupled to the first and second instrument panel sections;

an air bag cushion disposed in the module housing proximate the first side; and an inflator disposed within the module housing, the inflator being activatable to discharge inflator gas for inflating the air bag cushion, and wherein inflation of the air bag cushion under deployment conditions causes deformation of the module housing resulting in the first and second instrument panels separating and deployment of the air bag cushion there between, wherein said opening is formed prior to deployment of the air bag cushion.

2. The deformable air bag module as set forth in claim 1, wherein the module housing has a first width at the second side and a second width at the neck portion, the first width being greater than the second width.

3. The deformable air bag module as set forth in claim 1, wherein the module housing further includes a flange extending outwardly from the neck portion of the module housing.

4. The deformable air bag module as set forth in claim 1, wherein the instrument panel includes a front surface and an opposing rear surface, the rear surface including a tear seam formed therein, the tear seam defining the first and second instrument panel sections.

5. The deformable air bag module as set forth in claim 4, wherein the tear seam is aligned with the opening defined by the neck portion of the module housing.

6. The deformable air bag module as set forth in claim 4, wherein the module housing is disposed about the tear seam so that deployment of the air bag cushion causes the neck portion to expand resulting in deformation of the module housing and separation of the first and second instrument panel sections along the tear seam.

7. The deformable air bag module as set forth in claim 1, wherein the first and second instrument panel sections abut each other along a panel dividing line, wherein a portion of the dividing line is disposed adjacent to the opening defined by the neck portion and the module housing is coupled to the first and second instrument panel sections.

8. The deformable air bag module as set forth in claim 7, wherein the module housing is disposed about the panel dividing line so that deployment of the air bag cushion causes the neck portion to expand resulting in deformation of the module housing and separation of the first and second instrument panel sections along the panel dividing line.

9. A deformable air bag module for use in an instrument panel of a vehicle, the instrument panel having a first instrument panel section and an adjacent second instrument panel section, the deformable air bag module comprising:

a module housing having a first side and an opposing second side, wherein the module housing has a neck portion defining an opening at the first side, the opening being defined by portions of said neck portion being in a facing spaced relationship, the first side being coupled to the first and second instrument panel sections, said housing having a flange extending outwardly from the neck portion of the module housing;

an air bag cushion disposed in the module housing proximate the first side; and an inflator disposed within the module housing, the inflator being activatable to discharge inflator gas for inflating the air bag cushion, and wherein inflation of the air bag cushion under deployment conditions causes deformation of the module housing resulting in the first and second instrument panels separating and deployment of the air bag cushion there between, wherein each of the first and second instrument panel sections includes a retaining member for receiving the flange in a secure frictional fit to couple the module to the instrument panel.

10. A method of deploying an air bag cushion in an instrument panel, comprising:

providing an air bag module having a housing with a neck portion and an opening at a first side, the opening having a first dimension defined by opposing walls of said neck portion being in a facing spaced relationship, the air bag module including an inflator in fluid communication with the air bag cushion, the inflator and the air bag cushion being disposed within the housing;

dividing the instrument panel into first and second instrument panel sections, the air bag module being coupled to both the first and second instrument panel sections;

activating the inflator to generate inflator gas for inflation of the air bag cushion; and deforming the housing by directing the air bag cushion through the neck portion and the opening of the housing causing the neck portion and opening to expand to a second dimension, said second dimension being greater than said first dimension and resulting in the separation of the first and second instrument panel sections and deployment of the air bag cushion therebetween, wherein said opening having said first dimension is formed prior to the step of activating the inflator.

11. The method as set forth in claim 10, wherein the first and second instrument panel sections separate along a tear seam formed in a rear surface of the instrument panel, the tear seam dividing the instrument panel into the first and second instrument panel sections.

12. The method as set forth in claim 11, wherein the first and second instrument panel sections separate along a dividing crease formed between the first and second instrument panel sections which abut each other at the dividing crease.

13. A deformable air bag module for use in a vehicle, comprising:

a housing defining an interior cavity for receiving an inflator and an inflatable air bag in an un-inflated state, said housing also defining a neck portion, said neck portion defining an opening in said housing, said opening having a first dimension defined by opposing walls of said neck portion and being in fluid communication with said cavity, a portion of said housing being configured for securement to a portion of an instrument panel of a vehicle, wherein deployment of said inflatable air bag causes said neck portion to move from an un-deployed position to a deployed position, wherein said opening increasing in size to a second dimension, as said neck portion moves to said deployed position, said second dimension being greater than said first dimension, wherein said opening having said first dimension is formed prior to deployment of said inflatable air bag.

14. An air bag module, comprising:

an air bag cushion;

an inflator in fluid communication with said air bag cushion, said inflator being configured to release an inflation gas into said air bag cushion upon the detection of predetermined vehicle conditions to inflate said air bag cushion;

a housing having a first wall, a second wall, and a portion securing said first and second walls to one another such that a cavity is defined therein, said cavity being configured to receive said air bag cushion and said inflator, said first wall having a first neck portion terminating in a first retaining flange, said second wall having a second neck portion terminating in a second retaining flange, said first and second retaining flanges being configured for securement to at least one retaining member of an instrument panel; and an open mouth being defined between said first and second neck portions, wherein inflation of said air bag cushion causes said air bag cushion to enter said open mouth and to act on said first and second walls and said first and second neck portions to deform said housing such that said first and second retaining flanges separate from one another to permit said air bag cushion to exit the air bag module.

15. The air bag module as in claim 14, further comprising at least one tab extending into said open mouth, wherein said at least one tab shielding said air bag cushion from contact with either said first and second retaining flanges or said at least one retaining member when said air bag cushion exits the air bag module.

16. The air bag module as in claim 14, wherein said first and second retaining flanges are configured to allow said housing to deform.

17. A deformable air bag module for use in an instrument panel of a vehicle, the instrument panel having a first instrument panel section and an adjacent second instrument panel section each being configured and positioned to provide an air bag deployment opening upon activation of an inflator of the deformable air bag module, the deformable air bag module comprising:

a module housing having a neck portion being defined by a pair of opposing neck walls in a facing spaced relationship and a cushion storage area being configured to receive and enclose an inflatable cushion in an un-inflated state, said neck portion being in fluid communication with said cushion storage area;

a first flange portion depending away from one of said pair of opposing neck walls and a second flange portion depending away from the other one of said pair of opposing neck walls, said first flange portion being received and engaged by the first instrument panel section and said second flange portion being received and engaged by the second instrument panel section, wherein said pair of opposing neck walls define a neck area having an opening for receiving a portion of said inflatable cushion as said inflatable cushion is inflated by the inflator, said neck area and said opening being formed prior to activation of the inflator; and wherein further inflation of said portion of said inflatable cushion by the inflator causes said neck portion to expand and said first and second flange portions cause the first and second instrument panels to expand and define the air bag deployment opening.

18. The deformable air bag module as in claim 17, wherein said pair of opposing neck walls are angularly configured to direct said portion of said inflatable cushion into said neck opening.

19. The deformable air bag module as in claim 17, wherein said first flange portion and said second flange portion are configured to secure the deformable air bag module to a non-finish surface of the instrument panel.

20. The deformable air bag module as in claim 17, wherein said module housing is defined by a unitary structure comprising said neck portion, said pair of opposing neck walls, said cushion storage area, said first flange portion, said second flange portion; and said neck area.

21. The deformable air bag module as in claim 17, wherein said neck portion is configured to encourage bell-mouthing of the deformable air bag module as the inflatable cushion inflates.

22. A deformable air bag module for use in an instrument panel of a vehicle, the instrument panel having a first instrument panel section and an adjacent second instrument panel section each being configured and positioned to provide an air bag deployment opening upon activation of an inflator of the deformable air bag module, the deformable air bag module comprising:

a module housing having a neck portion being defined by a pair of opposing neck walls in a facing spaced relationship and a cushion storage area being configured to receive and enclose an inflatable cushion in an un-inflated state, said neck portion being in fluid communication with said cushion storage area;

a first flange portion depending away from one of said pair of opposing neck walls and a second flange portion depending away from the other one of said pair of opposing neck walls, said first flange portion being received and engaged by the first instrument panel section and said second flange portion being received and engaged by the second instrument panel section, wherein said pair of opposing neck walls define a neck area for receiving a portion of said inflatable cushion as said inflatable cushion is inflated by the inflator;

a first tab portion that depends away from one of said pair of opposing neck walls and a second tab portion that depends away from the other one of said pair of opposing neck walls, said first and second tab portions being configured to direct said inflatable cushion through the air bag deployment opening, wherein further inflation of said portion of said inflatable cushion by the inflator causes said neck portion to expand and said first and second flange portions cause the first and second instrument panels to expand and define the air bag deployment opening.

23. A method for providing a deployment opening in an instrument panel of a vehicle for an inflatable cushion to deploy therethrough, comprising:

inflating the inflatable cushion from an un-inflated state to a partially inflated state wherein a portion of the inflatable cushion expands from a cushion storage area to a neck portion, the neck portion being in fluid communication with the cushion storage area and the neck portion having an opening having a first dimension wherein a pair of opposing neck walls are in a facing spaced relationship, said opening being formed prior to the inflating of the inflatable cushion and allows the portion of the inflatable cushion to expand therein, one of said pair of opposing neck walls being secured to a first instrument panel section and the other of said pair of opposing neck walls being secured to a second instrument panel section; and separating said first instrument panel section from said second instrument panel section by further inflating the inflatable cushion after said portion of the inflatable cushion is received in said neck portion.

24. A method for providing a deployment opening in an instrument panel of a vehicle for an inflatable cushion to deploy therethrough, comprising:

inflating the inflatable cushion from an un-inflated state to a partially inflated state wherein a portion of the inflatable cushion expands from a cushion storage area to a neck portion, the neck portion being in fluid communication with the cushion storage area and the neck portion having a first dimension wherein a pair of opposing neck walls are in a facing spaced relationship, said first dimension allows the portion of the inflatable cushion to expand therein, one of said pair of opposing neck walls being secured to a first instrument panel section and the other of said pair of opposing neck walls being secured to a second instrument panel section;

separating said first instrument panel section from said second instrument panel section by further inflating the inflatable cushion after said portion of the inflatable cushion is received in said neck portion; and directing the inflatable cushion through the deployment opening by directing the inflatable cushion with a pair of tab members, one of said pair of tab members being positioned to depend away from one of said opposing neck walls and the other one of said tab members being positioned to depend away from the other one of said opposing neck walls.

* * * * *